(12) United States Patent
Gong

(10) Patent No.: US 8,469,466 B2
(45) Date of Patent: Jun. 25, 2013

(54) COMPUTER ENCLOSURE

(75) Inventor: Hai-Tao Gong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 12/955,924

(22) Filed: Nov. 30, 2010

(65) Prior Publication Data

US 2011/0279003 A1     Nov. 17, 2011

(51) Int. Cl.
*E05C 7/06* (2006.01)

(52) U.S. Cl.
USPC ........................................ 312/222; 312/223.2

(58) Field of Classification Search
USPC ................ 312/215, 222, 223.1, 223.2; 292/1, 292/80, 81, 87, DIG. 38, 194, 303; 361/679.31–679.33, 679.39
See application file for complete search history.

(56) References Cited

U.S. PATENT DOCUMENTS

| 7,036,783 B2 * | 5/2006 | Chen et al. | 248/298.1 |
| 7,336,482 B2 * | 2/2008 | Chen et al. | 361/679.33 |
| 2007/0145214 A1 * | 6/2007 | Lin et al. | 248/225.11 |

* cited by examiner

*Primary Examiner* — Darnell Jayne
*Assistant Examiner* — Matthew Ing
(74) *Attorney, Agent, or Firm* — Altis Law Group, Inc.

(57) ABSTRACT

A computer enclosure includes a bracket and a locking member. The bracket includes a side plate defining a slide slot. A first pair of positioning mechanisms and a second pair of positioning mechanisms are located on opposite sides of the slide slot. The locking member is configured for securing a disk drive in the bracket and includes a first pair of locking portions and a second pair of locking portions. The second pair of locking portions are engaged with the second pair of positioning mechanisms. The first pair of locking portions are resiliently deformable between a first state, in which the first pair of locking portions are engaged with the first pair of positioning mechanisms, and a second state, in which the first pair of locking portions are deformed in opposite directions and disengaged from the first pair of positioning mechanisms.

15 Claims, 5 Drawing Sheets

COMPUTER ENCLOSURE

BACKGROUND

1. Technical Field

The present disclosure relates to a computer enclosure for receiving disk drives.

2. Description of Related Art

A disk drive, such as a hard disk drive, or a CD-ROM drive, is usually provided in a computer system. The disk drive is conventionally secured to a bracket of the computer system with screws, which is very inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
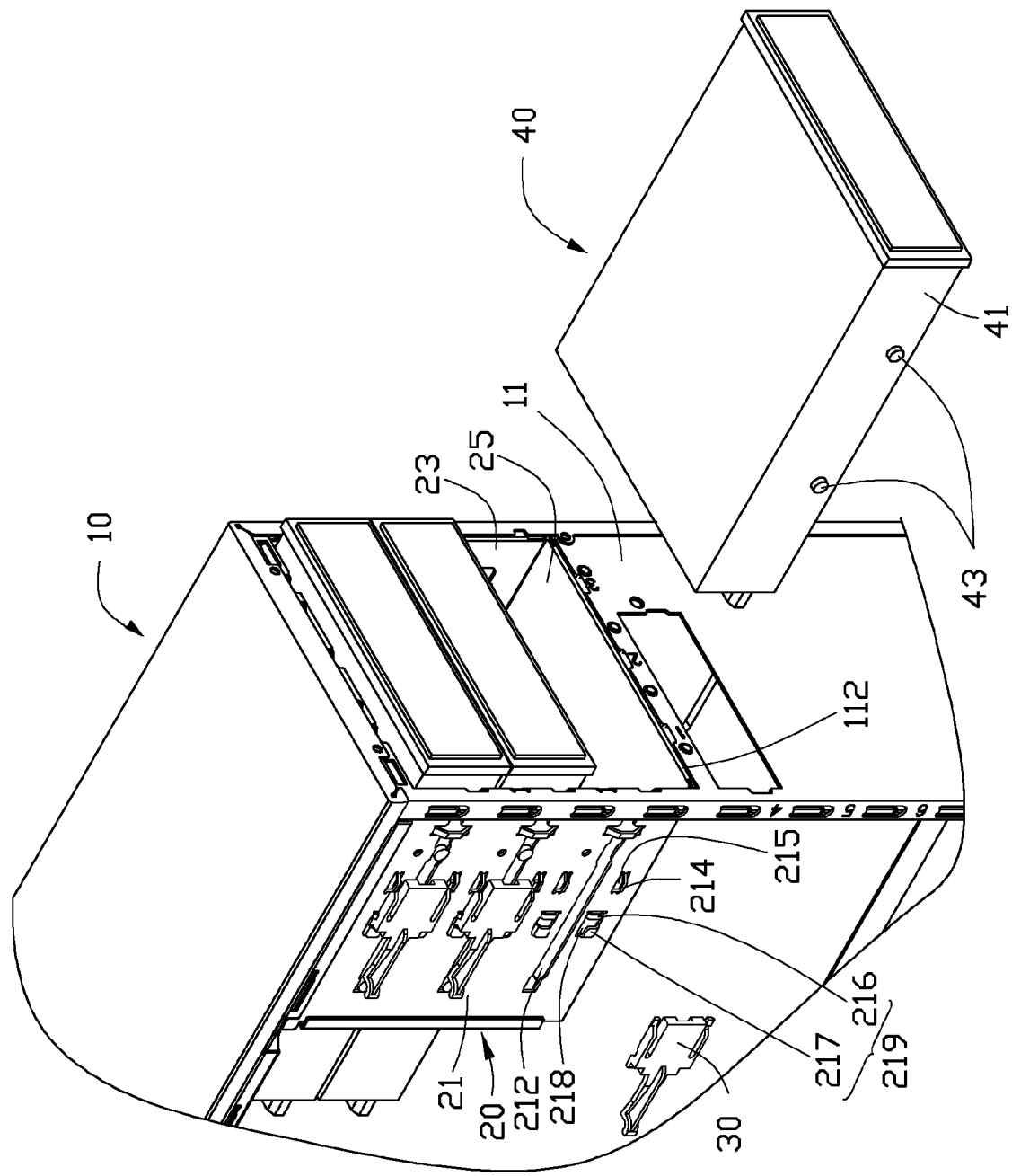
FIG. 1 is a partially exploded, isometric view of a computer enclosure and a number of disk drives in accordance with an embodiment.
Figure 4:
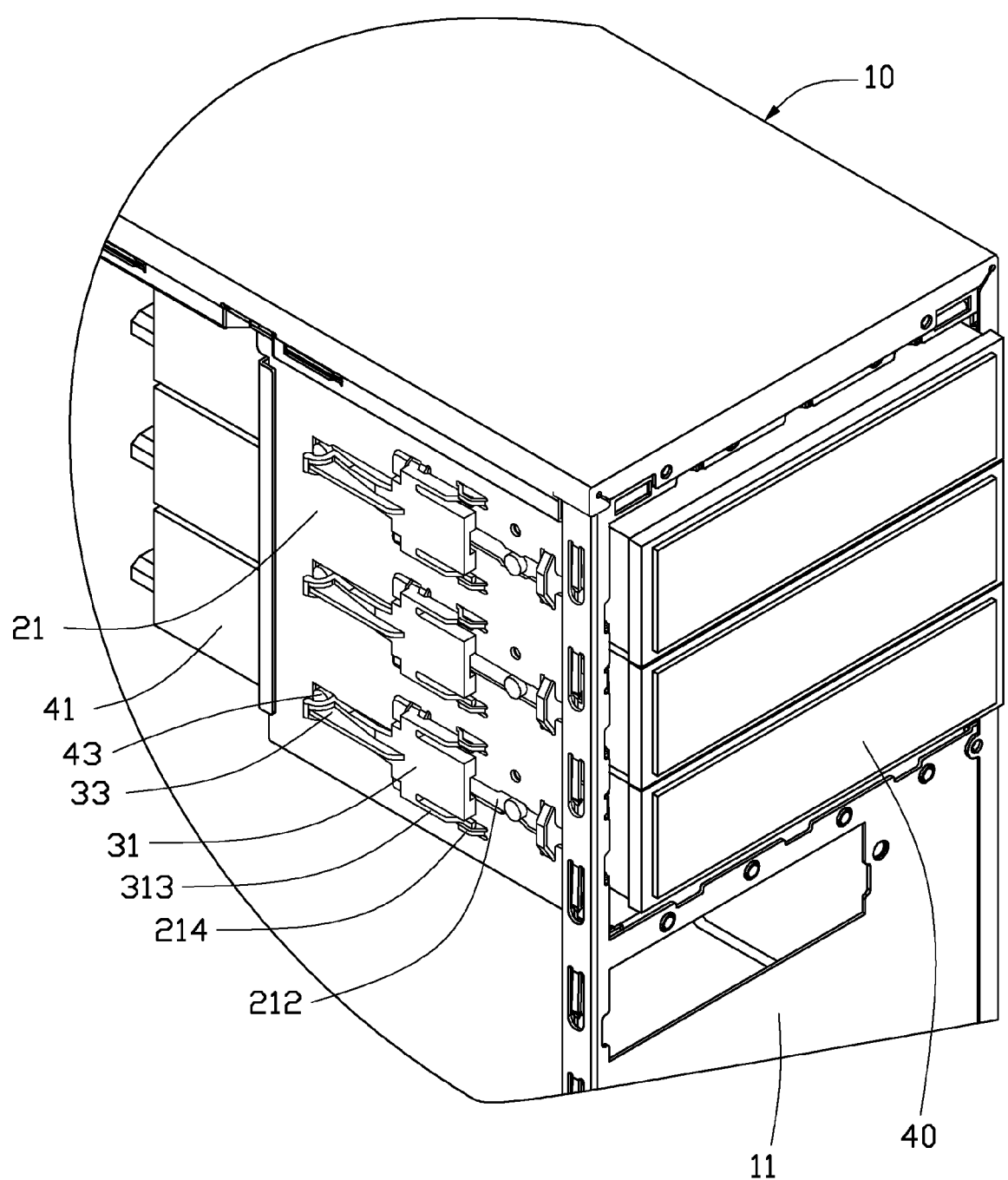
FIG. 4 is an assembled view of the computer enclosure and the disk drives of FIG. 1, and shows a handgrip in a first position.
Figure 5:
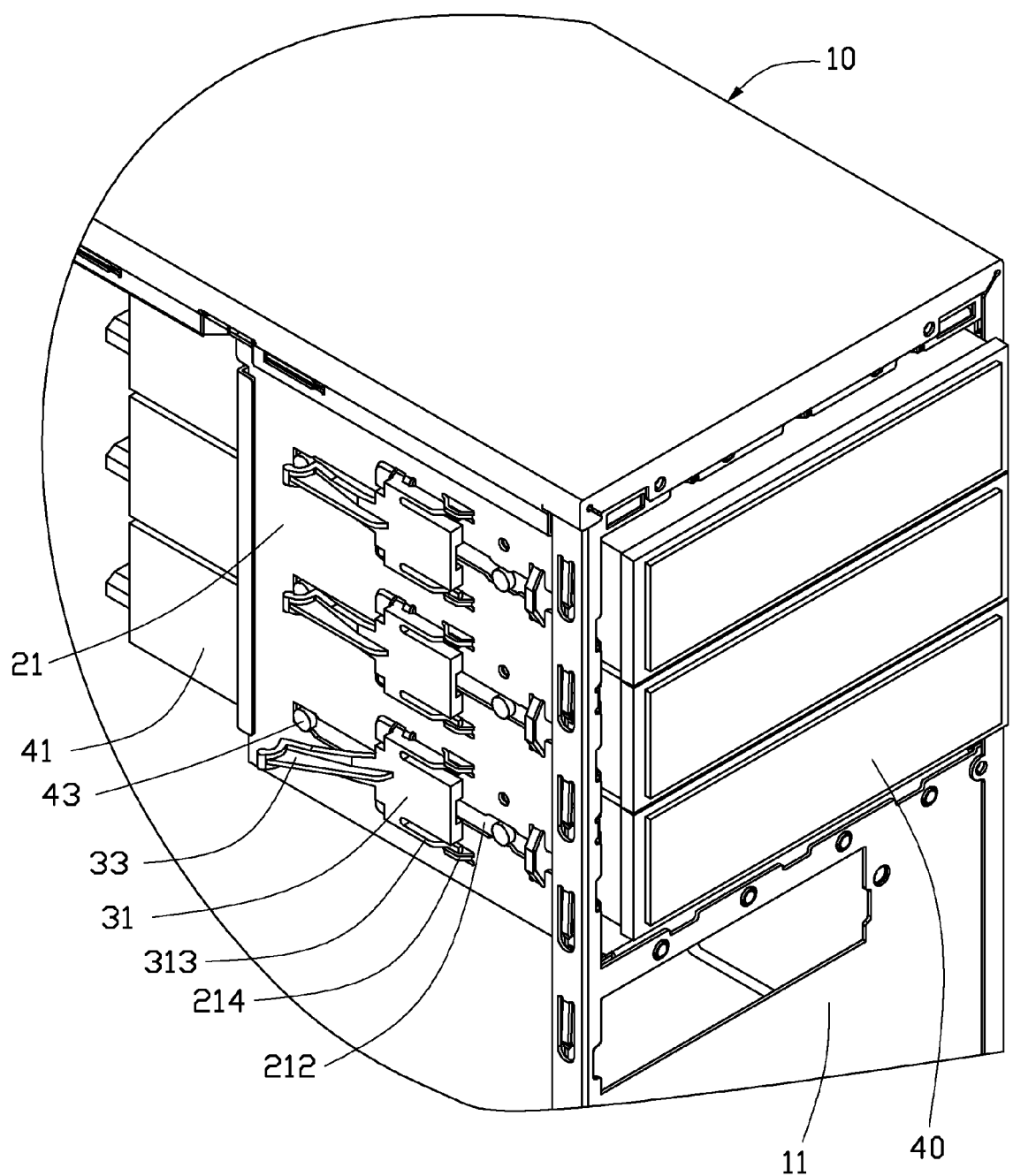
FIG. 5 is similar to FIG. 4, but shows the handgrip in a second position.

Referring to FIGS. 1, 4, and 5, a computer enclosure is provided for securing a disk drive 40. The disk drive 40 includes a first sidewall 41 and a second sidewall (not shown) opposite to the first sidewall 41. Two mounting posts 43 are located on each sidewall 41.

The computer enclosure in accordance with an embodiment includes a chassis 10, a bracket 20, and a locking member 30.

The chassis 10 includes a front plate 11. A through opening 112 is defined in the front plate 11 for the disk drive 40 to insert therethrough.

The bracket 20 is secured to the chassis 10, for receiving the disk drive 40. The bracket 20 includes a first side plate 21, a second side plate 23, and a bottom plate 25. The first side plate 21 and the second side plate 23 are located on opposite edges of the bottom plate 25. In one embodiment, the first and second side plates 21, 23 are substantially perpendicular to the bottom plate 25, and the first and second side plates 21, 23 and the bottom plate 25 are substantially perpendicular to the front plate 11 of the chassis 10. A number of slide slots 212 is defined in the first side plate 21, for receiving the mounting posts 43 of the disk drive 40. In one embodiment, the slide slots 212 extend in a first direction substantially parallel to the bottom plate 25 and the front plate 11. A first pair of positioning mechanisms 214 and a second pair of positioning mechanisms 219 are located on opposite sides of each slide slot 212.

A gap 215 is defined between each of the first pair of positioning mechanisms 214 and the outer surface of the first side plate 21. Each of the second pair of positioning mechanisms 219 includes a first positioning portion 216 and a second positioning portion 217 separated from the first positioning portion 216. A positioning hole 218 is defined between the second positioning portion 217 and the outer surface of the first side plate 21.

Figure 2:
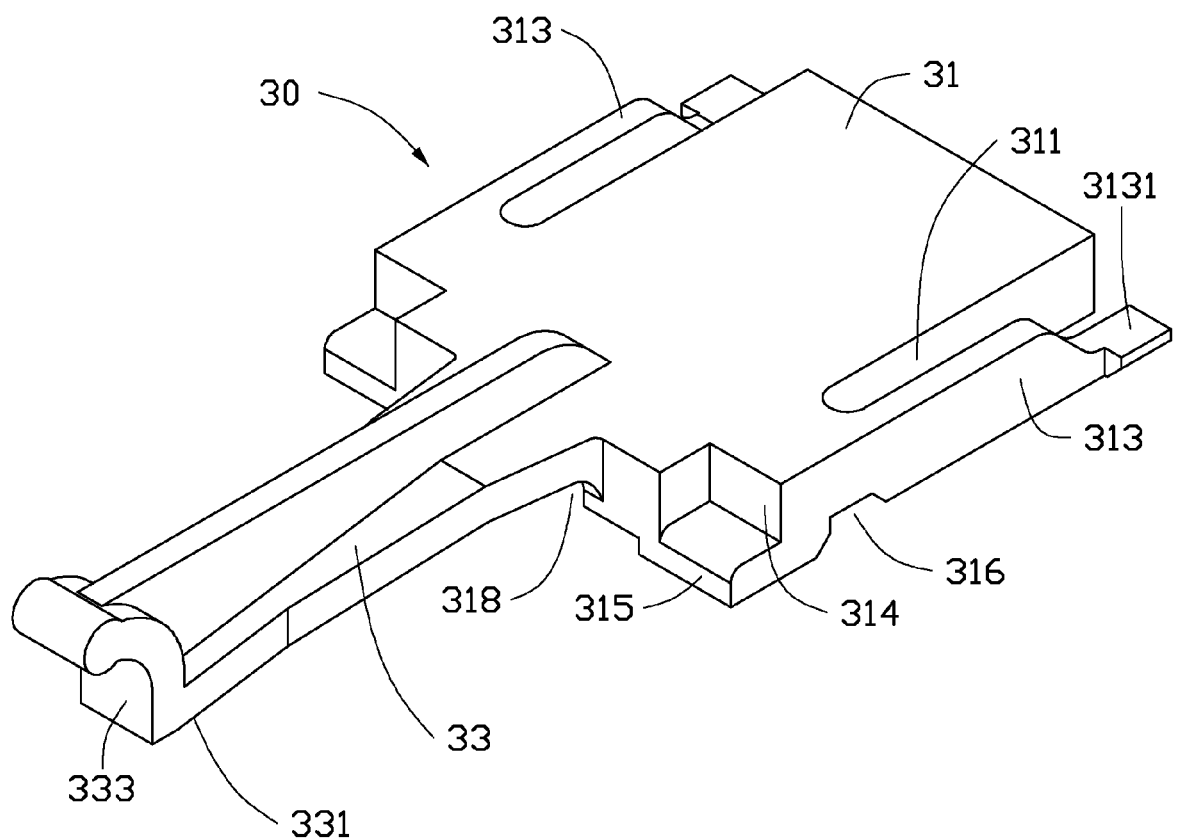
FIG. 2 is an isometric view of a locking member of FIG. 1.
Figure 3:
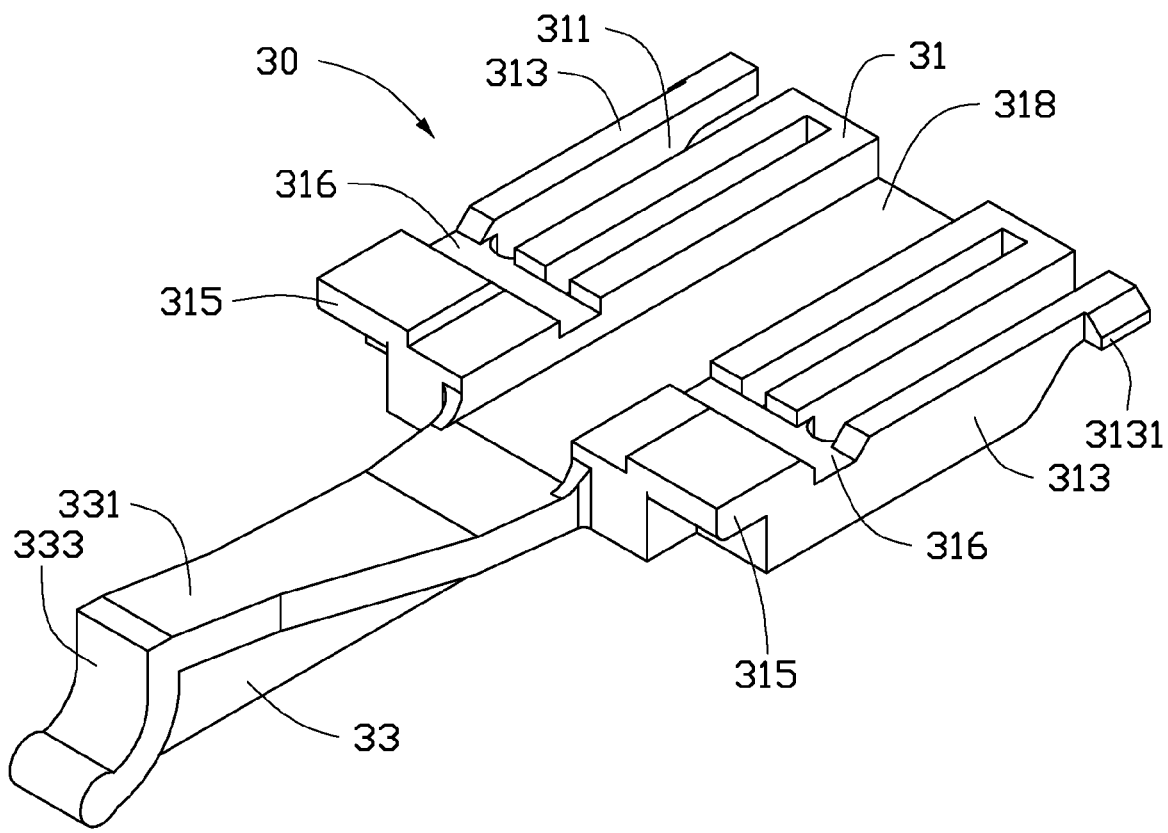
FIG. 3 is similar to FIG. 2, but viewed in a different aspect.

Referring to FIG. 2-3, the locking member 30 includes a base 31 and an handgrip 33 extending from the base 31. Two slits 311 are defined in the base 31 adjacent two opposite edges, thereby forming a first pair of locking portions 313. A locking tab 3131 is located on a free end of each of the first pair of locking portions 313, engages the gaps 215 of the bracket 20. Two cutouts 314 are defined in two corners of a first side of the base 31 at the opposite edges, away from the first pair of locking portions 313, thereby forming a second pair of locking portions 315. The second pair of locking portions 315 is resiliently deformable and engaged in the positioning holes 218 of the bracket 20. A guide slot 318 is defined in a second side of the base 31, for the mounting posts 43 of the disk drive 40 to pass therethrough. A receiving slot 316 is defined in the second side of the base 31. In one embodiment, the guide slot 318 extends in a second direction, and the receiving slot 316 extends in a third direction, which is substantially perpendicular to the second direction.

The handgrip 33 is resiliently deformable and includes a guide portion 331 and a blocking portion 333. The guide portion 331 is located between the cutouts 314 of the base 31. In one embodiment, the guide portion 331 has a slanted surface.

Referring to FIGS. 1-4, the locking member 30 is secured to the first side plate 21 of the bracket 20, and the second pair of locking portions 315 are inserted in the positioning holes 218. The first positioning portions 216 are engaged in the receiving slot 316. The locking tabs 3131 are engaged in the gaps 215. The guide slot 318 opposes the corresponding slide slot 212. The handgrip 33 extends into the slide slot 212, and a space is defined between the blocking portion 333 and a closed end of the corresponding slide slot 212.

If the locking member 30 is required to be removed from the first side plate 21 of the bracket 20, the first pair of locking portions 313 are resiliently deformed towards each other, to disengage the locking tabs 3131 from the gaps 215. The locking member 30 can be turned about the second positioning portions 217, to disengage the first positioning portion 216 from the receiving slot 316. Therefore, the second pair of locking portions 315 can be removed out of the positioning holes 218, and the locking member 30 can be removed from the first side plate 21 of the bracket 20.

In use, the handgrip 33 can be resiliently deformable between a first position and a second position. The handgrip 33 is in an original state when in the first position, and the guide portion 331 and the blocking portion 333 extend in the slide slot 212. In the second position, the handgrip 33 is resiliently deformed when in the second position, and the guide portion 331 and the blocking portion 333 are moved out of the slide slot 212 to position outside of the bracket 20.

In assembling the disk drive 40 to the bracket 20, the disk drive 40 is inserted into the bracket 20 through the through opening 112 of the front plate 11. The mounting posts 43 are slid in the slide slot 212 and pass through the guide slot 318. When one of the mounting posts 43 pushes the guide portion 331, the handgrip 33 is resiliently deformed from the first position to the second position, and the guide portion 331 and the blocking portion 333 are moved out of the slide slot 212. Therefore, the one mounting post 43 passes across the guide portion 331 and the blocking portion 333 and is slid into the space between the closed end of the slide slot 212 and the blocking portion 333. Then the handgrip 33 rebounds from the second position to the first position. Therefore, the one mounting post 43 is blocked by the blocking portion 333, and the disk drive 40 is secured in the bracket 20.

If the disk drive 40 is needed to be removed from the bracket 20, the handgrip 33 is resiliently deformed from the first position to the second position. The one mounting post 43 is released by the blocking portion 333 and thereby slides in the slide slot. Thus, the disk drive 40 can be removed out of the bracket 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:
   a bracket comprising a side plate, the side plate defining a slide slot, and a first pair of positioning mechanisms and a second pair of positioning mechanisms protrude from the side plate and are located on opposite sides of the slide slot;
   a locking member configured for securing a disk drive in the bracket, the locking member comprising a handgrip, a first pair of locking portions and a second pair of locking portions, the second pair of locking portions is engaged with the second pair of positioning mechanisms;
   wherein the first pair of locking portions are resiliently deformable between a first state, in which the first pair of locking portions are engaged with the first pair of positioning mechanisms, and a second state, in which the first pair of locking portions are deformed in opposite directions and disengaged from the first pair of positioning mechanisms; and the handgrip is resiliently deformable between a first position, in which the handgrip extends in the slide slot, to engage a mounting post of the disk drive in the slide slot, and a second position, in which the handgrip is moved out of the slide slot, to disengage the mounting post from the slide slot; each of the second pair of positioning mechanisms comprises a first positioning portion; and the locking member defines a receiving slot receiving the first positioning portions; each of the second pair of positioning mechanisms further comprises a second positioning portion; each second positioning portion and the side plate of the bracket together define a positioning hole therebetween; and the second pair of locking portions is located in the corresponding positioning holes; the first positioning portions of the second pair of positioning mechanisms are located between the second positioning portions of the second pair of positioning mechanisms and the first pair of positioning mechanisms; and when the first pair of locking portions are in the second state, the locking member is rotatable about the second positioning portions to disengage the first positioning portions from the receiving slot.

2. The computer enclosure of claim 1, wherein the locking member defines two slits to form the first pair of locking portions.

3. The computer enclosure of claim 1, wherein the locking member defines two cutouts to form the second pair of locking portions.

4. The computer enclosure of claim 1, wherein a locking tab is located on each of the first pair of locking portions; each of the first pair of positioning mechanisms defines a gap; and the locking tabs are located in the gaps when the first pair of locking portion is in the first state, and disengaged from the gap when the first pair of locking portion is in the second state.

5. The computer enclosure of claim 1, wherein the receiving slot extends in a first direction; the locking member defines a guide slot facing the slide slot of the side plate and extends in a second direction; and the first direction is substantially perpendicular to the second direction.

6. The computer enclosure of claim 1, wherein the handgrip and a closed end of the slide slot together define a space therebetween, for receiving the mounting post of the disk drive.

7. The computer enclosure of claim 6, wherein the handgrip comprises a guide portion extending along the slide slot; and the guide portion has a slanted surface facing the slide slot.

8. A computer enclosure comprising:
   a bracket comprising a side plate, the side plate defining a slide slot, a first pair of positioning mechanisms and a second pair of positioning mechanisms located on opposite sides of the slide slot;
   a locking member configured for securing a disk drive in the bracket, the locking member comprising a first pair of locking portions and a second pair of locking portions, the first pair of locking portions engaged with the first pair of positioning mechanisms, the second pair of locking portions is engaged with the second pair of positioning mechanisms, the locking member defining two slits adjacent the first pair of locking portions, so that the first pair of locking portions is resiliently deformable;
   where each of the second pair of positioning mechanisms comprises a first positioning portion and a second positioning portion; and the locking member defines a receiving slot receiving the corresponding first positioning portions; the first positioning portions of the second pair of positioning mechanisms are located between the second positioning portions of the second pair of positioning mechanisms and the first pair of positioning mechanisms; the first pair of locking portions are resiliently deformable between a first state, in which the first pair of locking portions are engaged with the first pair of positioning mechanisms, and a second state, in which the first pair of locking portions are deformed in opposite directions and disengaged from the first pair of positioning mechanisms; and when the first pair of locking portions are in the second state, the locking member is rotatable about the second positioning portions to disengage the first positioning portions from the receiving slot.

9. The computer enclosure of claim 8, wherein the locking member defines two cutouts to form the second pair of locking portions.

10. The computer enclosure of claim 8, wherein a locking tab is located on each of the first pair of locking portions; each of the first pair of positioning mechanisms defines a gap; and the locking tabs are located in the gaps when the first pair of locking portion is in the first state, and disengaged from the gap when the first pair of locking portion is in the second state.

11. The computer enclosure of claim 8, wherein each second positioning portion and the side plate of the bracket together define a positioning hole therebetween; and the second pair of locking portions are located in the corresponding positioning holes.

12. The computer enclosure of claim 8, wherein the receiving slot extends in a first direction; the locking member defines a guide slot facing the slide slot of the side plate and extends in a second direction; and the first direction is substantially perpendicular to the second direction.

13. The computer enclosure of claim 8, wherein the locking member further comprises a handgrip; and the handgrip is resiliently deformable between a first position, in which the handgrip extends in the slide slot, to engage a mounting post of the disk drive in the slide slot; and a second position, in which the handgrip is moved out of the slide slot, to disengage the mounting post from the slide slot.

14. The computer enclosure of claim 13, wherein the handgrip and a closed end of the slide slot together define a space therebetween for receiving a mounting post of the disk drive.

15. The computer enclosure of claim 14, wherein the handgrip comprises a guide portion extending along the slide slot; and the guide portion has a slanted surface facing the slide slot.

\* \* \* \* \*